United States Patent
Brown et al.

(10) Patent No.: US 7,184,798 B1
(45) Date of Patent: Feb. 27, 2007

(54) POWER CONSERVATION SYSTEM AND METHOD

(75) Inventors: Gary A. Brown, Fremont, CA (US); Neal Lane Horovitz, Los Altos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 517 days.

(21) Appl. No.: 10/264,216

(22) Filed: Oct. 3, 2002

(51) Int. Cl.
H04B 1/38 (2006.01)
H04M 1/00 (2006.01)

(52) U.S. Cl. .............. 455/574; 455/345.5; 455/344; 455/343.1; 455/343.2; 455/127.5; 455/180.3; 327/156; 327/143; 327/108; 713/322; 713/324; 713/501; 331/74; 331/96; 331/57; 331/158

(58) Field of Classification Search .......... 455/574, 455/343.5, 343.1, 343.2, 127.5, 180.3; 710/14, 710/203; 327/143, 172; 713/321, 324
See application file for complete search history.

(56) References Cited

U.S. PATENT DOCUMENTS

| 5,103,192 | A | * | 4/1992 | Sekine et al. ............... 331/1 A |
| 5,276,857 | A | * | 1/1994 | Hartung et al. ............. 714/724 |
| 5,369,647 | A | * | 11/1994 | Kreifels et al. ............. 714/736 |
| 5,371,764 | A | * | 12/1994 | Gillingham et al. ........ 375/354 |
| 5,373,255 | A | * | 12/1994 | Bray et al. .................. 331/1 A |
| 5,455,930 | A | * | 10/1995 | Larson ........................ 713/502 |
| 5,513,358 | A | * | 4/1996 | Lundberg et al. ........... 713/330 |
| 5,541,929 | A | * | 7/1996 | Jokura ......................... 370/337 |
| 5,638,028 | A | * | 6/1997 | Voth ............................ 331/25 |
| 5,742,650 | A | * | 4/1998 | Nuckolls et al. ............ 375/376 |
| 5,778,251 | A | * | 7/1998 | Kuroiwa et al. ............. 710/14 |
| 5,983,287 | A | * | 11/1999 | Kuroiwa et al. ............. 710/14 |
| 5,987,339 | A | * | 11/1999 | Asano ........................ 455/574 |
| 6,202,102 | B1 | * | 3/2001 | Kuroiwa et al. ............. 710/14 |
| 6,223,295 | B1 | * | 4/2001 | Wang et al. ................ 713/320 |
| 6,278,304 | B1 | * | 8/2001 | Livezey ..................... 327/157 |

* cited by examiner

*Primary Examiner*—Marceau Milord
(74) *Attorney, Agent, or Firm*—Merchant & Gould P.C.; Mark R. Hennings

(57) ABSTRACT

A power management circuit is arranged to apply power to and remove power from its own oscillator to conserve power. A power-on reset circuit provides a power-on-reset signal to a state machine. The state machine contains states that are programmed with information that is used to power up or down various subsystems within a device that includes the power management systems, including the oscillator of the state machine. The state machine assumes a known state and applies power to the oscillator in response to the power-on-reset signal. The state machine changes states in response to system events (e.g., a keypress). The state machine also maintains power to the oscillator during the period of time and which the state machine requires clock signal from the oscillator. The state machine can power down the oscillator to conserve power when the state machine does not require a clock signal from the oscillator.

17 Claims, 2 Drawing Sheets

POWER CONSERVATION SYSTEM AND METHOD

FIELD OF THE INVENTION

The present invention relates generally to power management systems, and more particularly to low power conservation for a state machine and its oscillator.

BACKGROUND OF THE INVENTION

Power management is required in many electronic devices. Power management is especially desired for portable electronic devices (such as cellular telephones), where the portable electronic devices have a limited power capacity. Intelligent power management systems are used to control the application of power to various circuits within the portable electronic devices. The controlled application of power extends the length of time that the portable electronic devices can be used.

SUMMARY OF THE INVENTION

The present invention is directed towards a power management circuit that includes an oscillator, a switching circuit, and a state machine. The oscillator is configured to produce a clock signal when enabled. The switching circuit is configured to disable the oscillator. The state machine has at least two inputs. The first input is configured to receive the clock signal. The second input is configured to receive a system event signal. The state machine is configured to selectively actuate the switching circuit in response to the system event signal such that the oscillator is selectively disabled to conserve power.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

A more complete appreciation of the present invention and its improvements can be obtained by reference to the accompanying drawings, which are briefly summarized below, to the following detailed description of illustrated embodiments of the invention, and to the appended claims.

DETAILED DESCRIPTION OF THE PREFERRED EMBODIMENT

Figure 1:
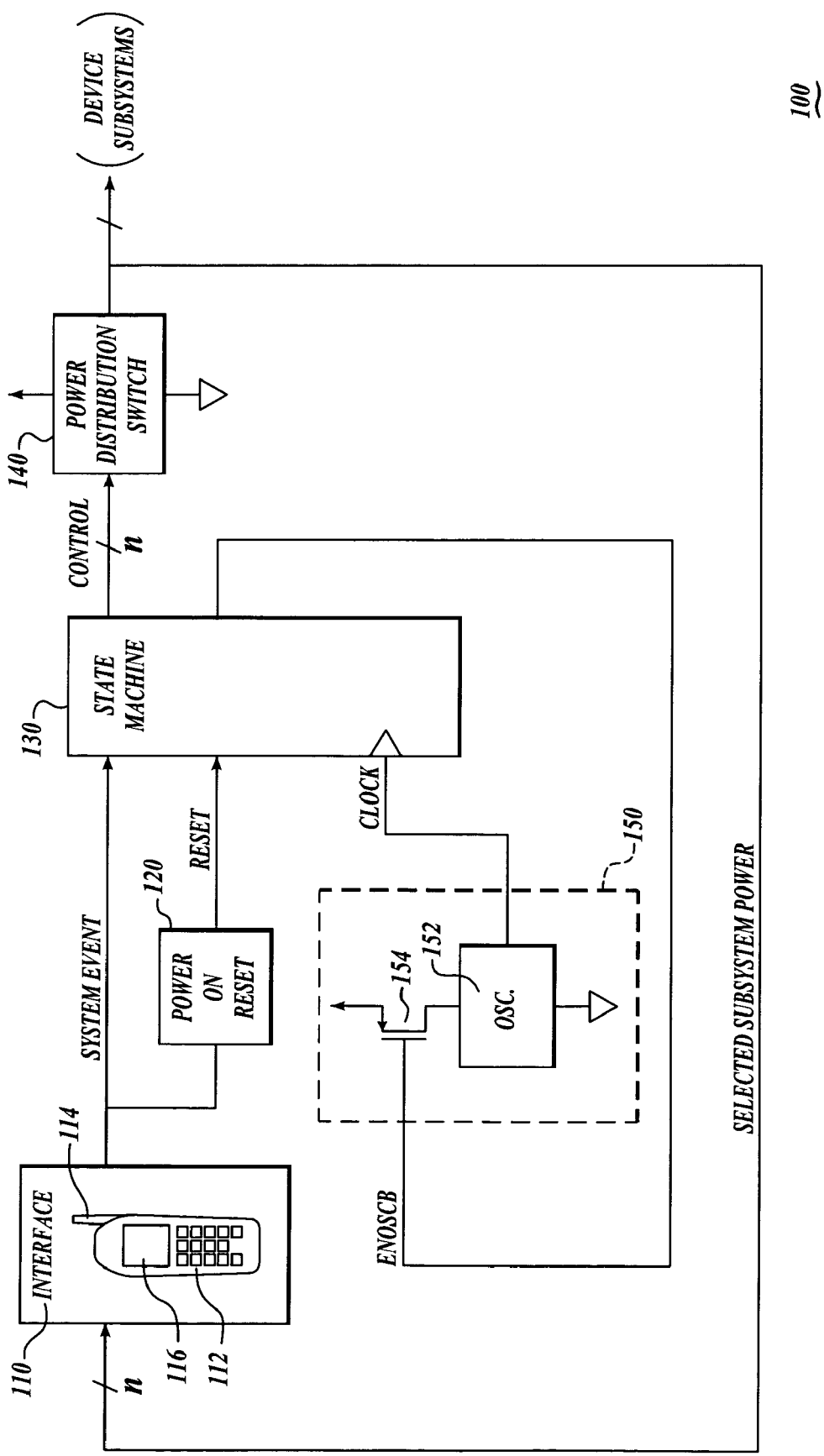
FIG. 1 shows a schematic of an example power conservation system in accordance with the present invention.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

The present invention is directed towards a power management system that is capable of selectively applying power to its own oscillator. Selectively applying power to the oscillator is desirable because power consumption is reduced (thereby saving power, which is typically limited in portable electronic devices). A power-on reset circuit is configured to provide a power-on-reset signal to a state machine. The state machine contains states that are programmed with information that is used to control power to various subsystems within the purview of the power management system. The states also contain information that is used to control power to the oscillator of the state machine. The state machine assumes a known state and applies power to the oscillator in response to the power-on-reset signal. The state machine is configured to change states in response to system events (e.g., a keypress). The state machine is also configured to maintain power to the oscillator during the period of time in which the state machine requires a clock signal from the oscillator. The state machine can power down the oscillator to conserve power when the state machine does not require a clock signal from the oscillator.

FIG. 1 shows a schematic of an example power conservation system in accordance with the present invention. As shown in FIG. 1, system 100 includes System Interface 110, Power-On Reset Circuit 120, State Machine 130, Power Distribution Switch 140, and Selectable Oscillator 150. System Interface 110 includes keys 112 and communications port 114. Selectable Oscillator 150 includes Oscillator 152 and switching circuit 154.

System Interface 110 is coupled to Power-On Reset Circuit 120 and State Machine 130. Power-On Reset Circuit 120 is coupled to State Machine 130. State Machine 130 is coupled to Power Distribution Switch 140 and Selectable Oscillator 150. Selectable Oscillator 150 is coupled to a clock input terminal of State Machine 130. Power Distribution Switch 140 has an output bus that is coupled to System Interface 110 and device subsystems.

System Interface 110 is responsive to events. Example events include scheduled events, unscheduled events, and user-activated events. User-activated events may be initiated by keys 112, transceiver 114, touchscreen 116, a voice-activated input unit, and the like. Users can press one or more keys 112 to activate (or deactivate) various functions, which may relate to power management. Virtual keypresses can be implemented using touchscreen 116. Unscheduled events may be initiated by communications port 114. Communications port 114 may include a transceiver that is configured to receive wireless communications (such as an incoming call). Scheduled events may be initiated by timers, calendar appointments, and the like.

System Interface 110 communicates the occurrence of events (and the events' type) to State Machine 130 via a system event signal. The system event signal may be any signal that uses a protocol that is suitable for communicating the occurrence of an event and the type of events.

Power-On Reset 120 monitors the system event signal for any event that is of a type that may require State Machine 130 to assume a known state (e.g., reset to state "zero"). Power-On Reset 120 may also monitor the voltage level between a first and a second voltage reference (e.g., VCC and ground) to determine application of power to system 100. Power-On Reset 120 may provide a reset signal to State Machine 130 in response to an event or upon detection of the application of power to system 100.

State Machine 130 activates Selectable Oscillator 150 in response to an event. (State Machine 130 requires a clock signal to operate, which is provided by Oscillator 150 as described below.) State Machine 130 may change states in response to an event when a clock signal is provided. State Machine 130 may also change states in response to a power-on reset event.

State Machine 130 is programmed having various states that contain power management information. To save power, subsystems of a device (including system 100) can be powered down when the subsystems are not being used. State Machine 130 monitors the system event signal and toggles power (i.e., alternately applies and removes power) to the various subsystems in accordance with information that is associated with the current state. State Machine 130 deactivates Selectable Oscillator 150 in response to a terminal state being reached. Removing power from Oscillator 150 (when State Machine 130 does not require a clock) conserves power.

Power Distribution Switch 140 is a switching matrix that is configured to distribute power to selected subsystems in response to state information from State Machine 130 such that power to various subsystems is alternately toggled.

Selectable Oscillator 150 is configured to generate a clock when activated. In one embodiment, Selectable Oscillator 150 is configured to close switching circuit 154 such that power is applied to Oscillator 152. Opening switching circuit 154 causes power to be removed from Oscillator 152 such that the oscillator is disabled and power is conserved.

To illustrate, a user who wants to "turn on" a device (containing system 100) can press a key on the device. Interface 110 detects the keypress and signals the event and its type (e.g., event type="keypress"). State Machine 130 (which currently lacks a clock signal) activates switching circuit 154 in response to the event. Selectable Oscillator 150 generates a clock signal in response to the application of power from switching circuit 154. State Machine 130 may traverse through various states, and during each traversed state apply power to (or power remove from) various subsystems in response to state information. After State Machine 130 reaches a terminal state, it directs switching circuit 154 to remove power from Selectable Oscillator 150 to conserve power.

When the user wants to "turn off" the device (containing system 100), the user can press a key on the device. Interface 110 detects the keypress and signals the event and its type. State Machine 130 (which currently lacks a clock signal) activates switching circuit 154 in response to the event. Selectable Oscillator 150 generates a clock in response to the application of power from switching circuit 154. State Machine 130 may traverse through various states, and during each traversed state remove power from (or apply power to) various subsystems in response to state information. After State Machine 130 reaches a terminal state, it directs switching circuit 154 to remove power from Selectable Oscillator 150 to conserve power.

To further illustrate the operation of system 100, an incoming call can be detected by communications port 114. Interface 110 signals the incoming call event. State Machine 130 (which currently lacks a clock signal) activates switching circuit 154 in response to the event. Selectable Oscillator 150 generates a clock in response to the application of power from switching circuit 154. State Machine 130 may traverse through various states, and during each traversed state apply power to (or power remove from) various subsystems in the device to handle the incoming call. After State Machine 130 reaches a terminal state, it directs switching circuit 154 to remove power from selectable Oscillator 150 to conserve power.

Figure 2:
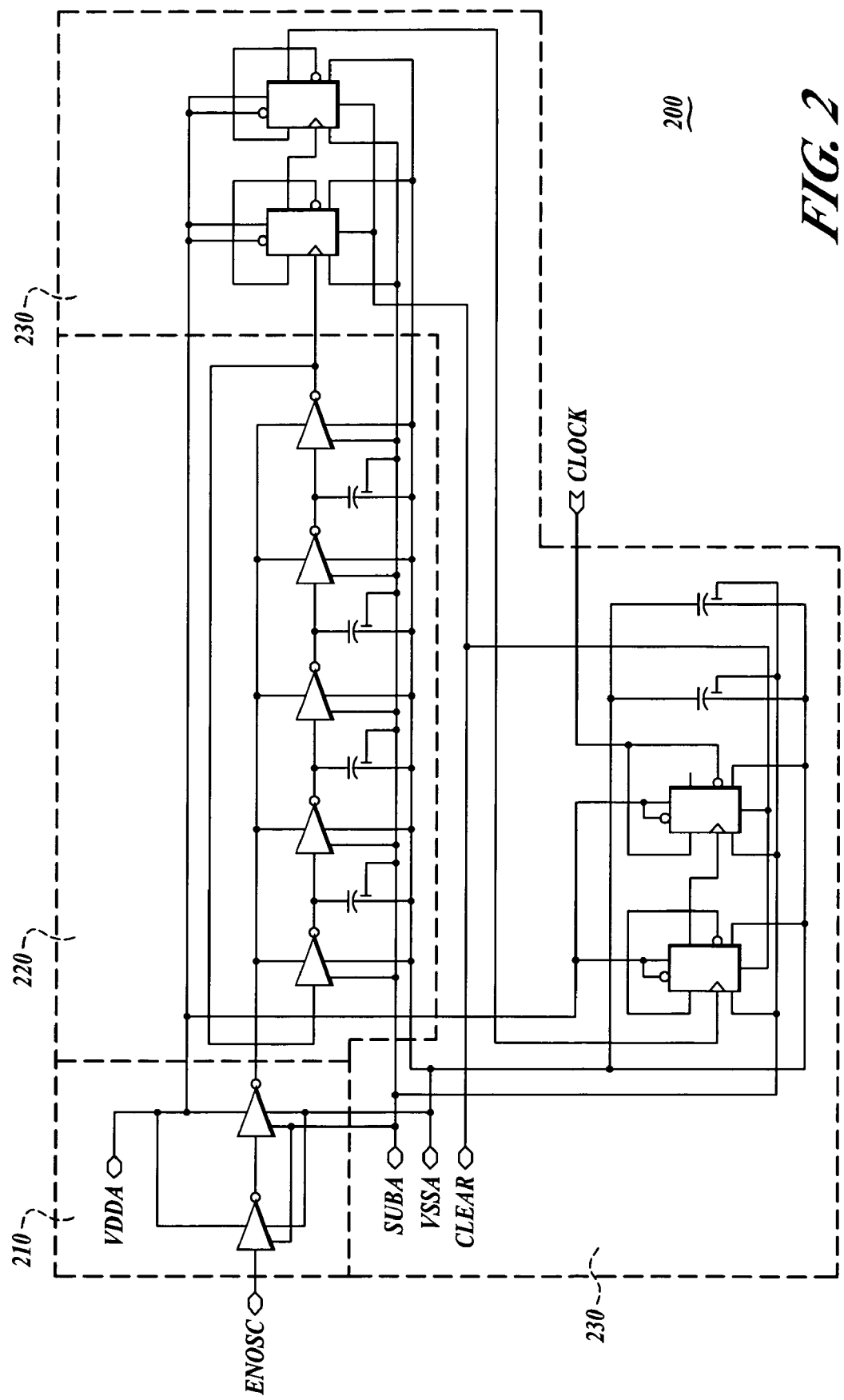
FIG. 2 shows a schematic of an example oscillator in accordance with the present invention.

FIG. 2 shows a schematic of an example oscillator in accordance with the present invention. Oscillator 200 includes Power Input Buffer 210, Ring Oscillator 220, and Frequency Divider 230. A control terminal of Power Input Buffer 210 is coupled to an output of State Machine 130. A power output of Power Input Buffer 210 is coupled to the power input of Ring Oscillator 220. The output of Ring Oscillator 220 is coupled to the input of Frequency Divider 230. The output of Frequency Divider 230 is coupled to a clock input of State Machine 130.

Power Input Buffer 210 is configured to selectively apply power to the ring portion of Ring Oscillator 220 in response to a control signal (enosc) received from State Machine 130. Removing power from the ring portion prevents a clock signal from being generated, which conserves power. (In CMOS circuits, power dissipation is proportional to frequency.) Ring Oscillator 220 is configured to produce a ring clock signal response to the applied power. Frequency Divider 230 is configured to produce a lower frequency clock signal in response to the ring clock signal. The lower frequency clock signal may be divided further or used to directly drive a clock input of State Machine 130.

Components described herein may be formed by using discrete components or by using a combination of hardware and algorithms (software). These components may include a processor such as a microcontroller, microprocessor, state machine, combinatorial logic, a combination of these, and the like. The system may be implemented using the same integrated circuit or using a combination of different integrated circuits.

Other embodiments of the invention are possible without departing from the spirit and scope of the invention. For example, switching circuit 154 can be placed between Oscillator 152 and a power supply reference that is different from the first power supply reference. Alternatively, switching circuit 154 can be used to control the application of power to a portion (that is less than the whole) of Oscillator 150. Additionally, control logic for switching circuit 154 can be provided such that power is automatically applied to Oscillator 150 whenever a system event is detected that requires the use of State Machine 130.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A circuit for controlling an oscillator in a system, comprising:
    an oscillator that is configured to produce a clock signal when enabled;
    a switching circuit that is configured disable the oscillator;
    a state machine that is arranged to provide a control signal to a control terminal of the switching circuit, wherein the state machine includes a first input that is configured to receive the clock signal, and a second input that is configured to receive a system event signal, and wherein the state machine is configured to selectively actuate the switching circuit in response to the system event signal such that the oscillator is selectively disabled to conserve power.

2. The circuit of claim 1, wherein the control signal activates the oscillator when the system event signal is a power-up reset event.

3. The circuit of claim 2, wherein the control signal further deactivates the oscillator after an expiration of an interval of time after activating the oscillator.

4. The circuit of claim 1, wherein the system event signal indicates a scheduled event.

5. The circuit of claim 1, wherein the system event signal indicates a key press event.

6. The circuit of claim 1, wherein the system event signal indicates an incoming call event.

7. The circuit of claim 1, wherein the system event signal indicates a power-down event.

8. A circuit for conserving power required by a state machine in a power conservation system, comprising:
   means for determining that is arranged to detect when a system event requires a change in the state machine;
   means for activating that is arranged to activate an oscillator, whereby a clock is produced for use by the state machine;
   means for providing the clock to the state machine when the oscillator is active;
   means for changing states in the state machine; and
   means for deactivating the oscillator after the state machine has changed states.

9. The method of claim 8, wherein a switching means is arranged to selectively activate and deactivate the oscillator in response to a control signal.

10. The method of claim 9, wherein the control signal is provided by the state machine.

11. The method of claim 8 further comprising means for applying power to a subsystem of the power conservation system in response to the state machine, wherein the subsystem consumes power.

12. The method of claim 8 further comprising means for removing power to a subsystem of the power conservation system in response to the state machine, wherein the subsystem consumes power.

13. A method for conserving power required by a state machine in a power conservation system, comprising:
   monitoring system events;
   receiving a system event;
   analyzing the received system event to determine when the received system event requires a change in the state machine;
   activating an oscillator when required by the state machine, whereby a clock signal is produced by the oscillator for use by the state machine;
   operating the state machine while the clock is active; and
   deactivating the oscillator after the state machine has reached a terminal state.

14. The method of claim 13, wherein activating the oscillator comprises coupling power to the oscillator.

15. The method of claim 14, wherein the state machine directs a switching circuit to couple power to the oscillator.

16. The method of claim 13, further comprising applying power to a subsystem of the power conservation system in response to a state of the state machine.

17. The method of claim 13, further comprising removing power from a subsystem in response to a state of the state machine.

\* \* \* \* \*

UNITED STATES PATENT AND TRADEMARK OFFICE
CERTIFICATE OF CORRECTION

| | | |
|---|---|---|
| PATENT NO. | : 7,184,798 B1 | Page 1 of 1 |
| APPLICATION NO. | : 10/264216 | |
| DATED | : February 27, 2007 | |
| INVENTOR(S) | : Brown et al. | |

It is certified that error appears in the above-identified patent and that said Letters Patent is hereby corrected as shown below:

On title page
In the Abstract: Item [57]

Line 10, change "and" to --in--.

Signed and Sealed this

Twenty-first Day of August, 2007

JON W. DUDAS
*Director of the United States Patent and Trademark Office*